Oct. 1, 1963
C. L. CARTWRIGHT ETAL
3,105,383
WEATHER INDICATOR DEVICE
Filed Nov. 28, 1960
2 Sheets-Sheet 1
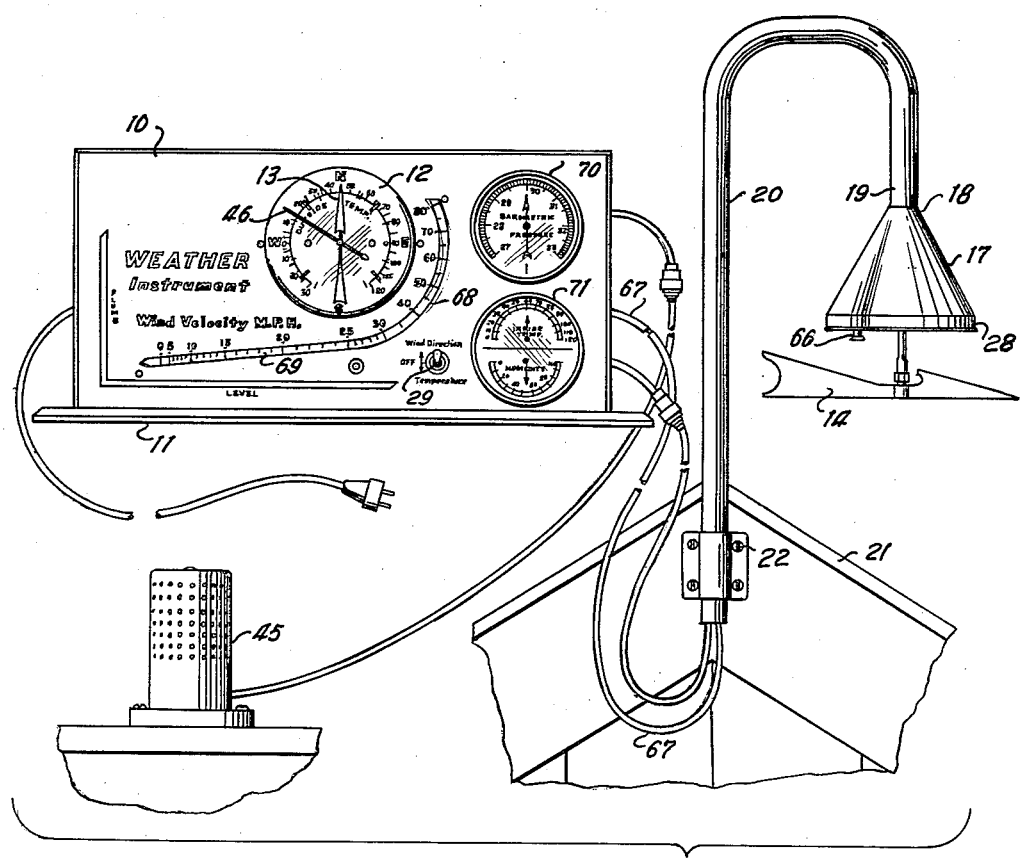
Fig. 1
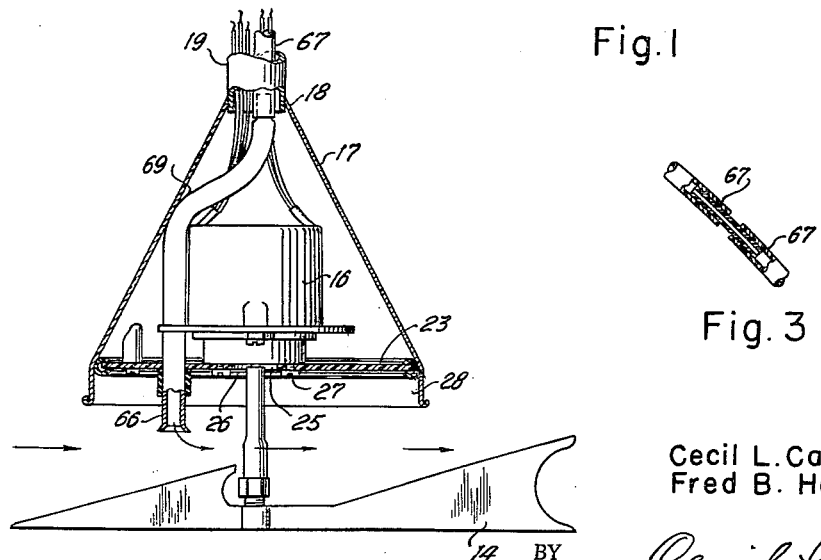
Fig. 2
Fig. 3
INVENTORS
Cecil L. Cartwright
Fred B. Heitmeyer
BY Cecil L. Wood
ATTORNEY INVENTORS
Cecil L. Cartwright
Fred B. Heitmeyer

BY

ATTORNEY

United States Patent Office 3,105,383
Patented Oct. 1, 1963

3,105,383
WEATHER INDICATOR DEVICE
Cecil L. Cartwright, 2011 Cedar Crest, and Fred B. Heitmeyer, 2514 Hillside, both of Dallas, Texas
Filed Nov. 28, 1960, Ser. No. 72,150
1 Claim. (Cl. 73—189)

This invention relates to weather indicating instruments adapted for installation indoors to indicate, by suitable instruments, wind direction and velocity, indoor and outdoor temperatures, barometric pressures, and humidity, and its principal object resides in the provision of an instrument panel, with both physical and electronic means for actuating the same, to provide accurate information indoors regarding weather conditions as they exist outdoors.

A prime object of the invention is that of providing a simple, economical and compact arrangement of parts by which the several instruments employed for indicating the different phases of weather information can be visually displayed on a single compact panel while affording a dependable means for observing, at all times, any existing weather conditions.

An object of the invention resides in the provision of a simple and unique device adapted for installation on a roof, in which a combination of elements are acted upon by wind pressures to both indicate the wind direction and velocity to be transmitted to the instrument panel.

Yet another object of the invention is that of providing an instrument panel of attractive design capable of arrangement in any suitable location, as on a table, a television cabinet, or the like, for ready accessibility, and if desirable, include a suitable lamp for illumination.

A further object of the invention resides in the provision of apparatus in which is embodied synchronous electronic devices by which wind direction and outside temperatures are transmitted to instruments on the panel, although remotely situated therefrom, and through which accurate information is indicated by the said instruments.

Broadly, the invention contemplates the provision of apparatus by which both wind velocity and direction, as well as indoor and outdoor temperatures, can be readily indicated on a single compact indoor panel arranged in any convenient location.

While the foregoing objects are paramount, other and lesser objects will become manifest as the description proceeds, taken in connection with the appended drawings wherein:

FIGURE 1 is a schematic illustration of the invention showing the instrument panel, the wind actuated vane and velocity tube mounted on the roof, and the outdoor temperature unit.

FIGURE 2 is a fragmentary sectional view of the wind direction and velocity unit, showing the wind actuated vane and synchronous motor actuated thereby.

FIGURE 3 is a fragmentary sectional illustration of a typical tube coupling.

Figure 4:
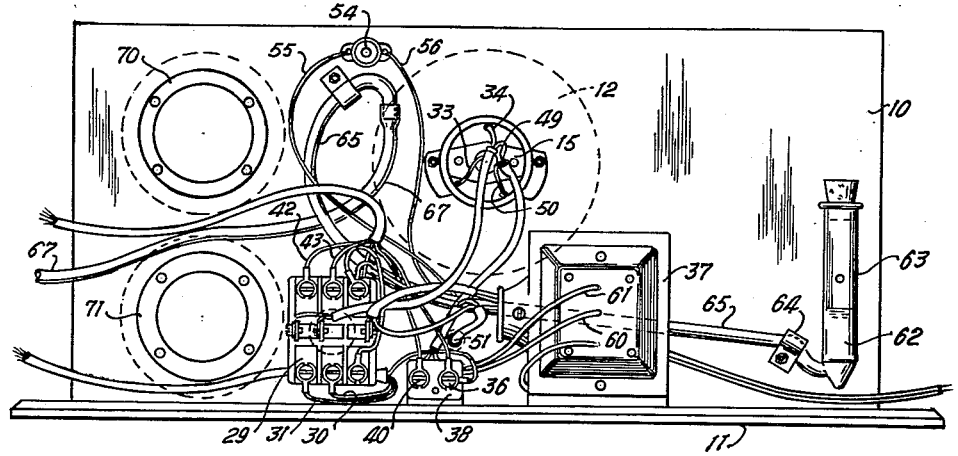
FIGURE 4 is a rear elevational view of the instrument panel showing the wind velocity tube, the transformer, and the electrical connections, and FIGURE 5 diagrammatically illustrates the wiring circuit.

The invention, in its preferred form, primarily comprises a panel 10 which may be of any desired form, preferably of plastic, and adapted for arrangement on a wall or for support on a table, desk, or other suitable location, and is illustrated in FIGURES 1 and 4 with a base 11 by which the panel 10 can be supported in a vertical position on a level surface. The arrangement of the instruments on the panel 10 is optional, and may include any or all of those illustrated in FIGURE 1.

Figure 5:
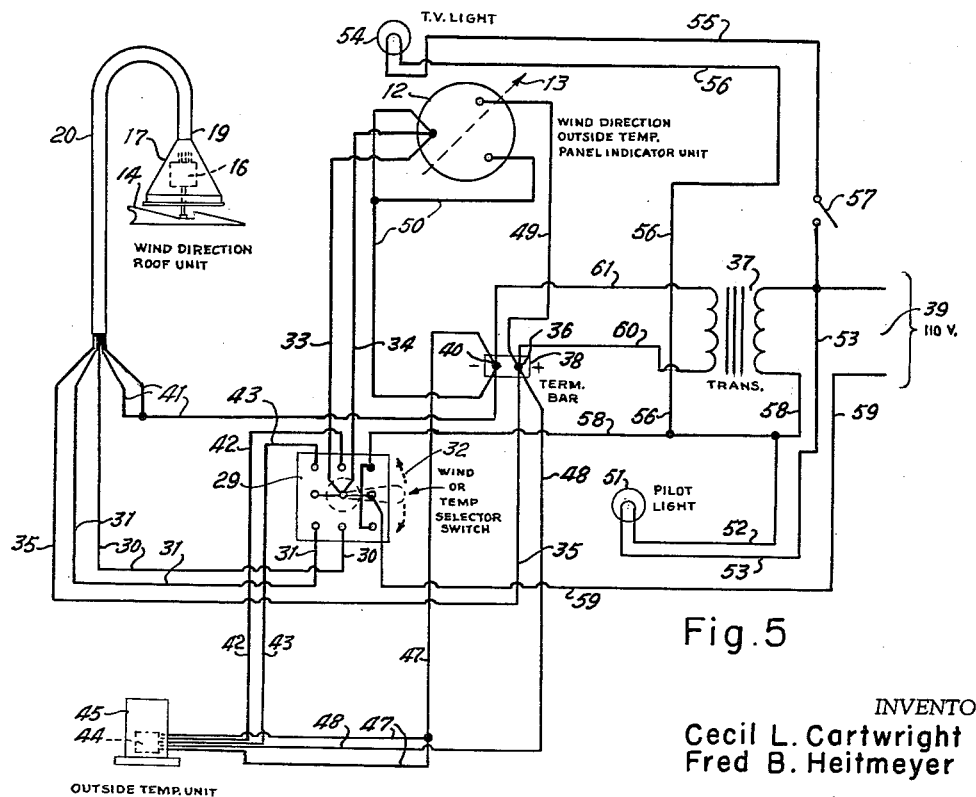

A dial 12 is arranged in the approximate center of the panel 10 having a pointer 13 thereon for indicating the wind direction through the action of a vane 14 and a pair of auto synchronous motors 15 and 16 on the panel 10 and associated with a roof unit 17, respectively, as shown in FIGURES 1 and 4, and in the electrical diagram illustrated in FIGURE 5.

The unit 17 may be of any suitable form, and is shown in FIGURES 1 and 2 as conical, having its truncated upper end 18 attached to the depending end 19 of a tubular standard 20 which is substantially U-shaped, as shown in FIGURES 1 and 5, and is secured to the roof structure 21 of a building (not shown) by a bracket 22.

The unit 17 is illustrated in vertical section in FIGURE 2 in which is shown the auto synchronous motor 16 supported in the unit 17 on a circular plate 23 secured by screws 24, or other suitable device, in the lower end thereof. The plate 23 is preferably of plastic material to resist rust and corrosion, and has a central opening 25 therein through which the shaft 26 of the motor 16 extends, the latter being secured to the plate 23 about the opening 25 by screws 27. A flange 28 formed with the unit 17 extends below the plate 23, as shown in FIGURE 2.

Referring to the wiring diagram illustrated in FIGURE 5, the motor 16 is connected to a toggle switch 29 by conductors 30 and 31 which, when the switch 29 is in its uppermost position, as indicated by the arrows 32, are connected to conductors 33 and 34 which are connected to the motor 15 behind the dial 12. A third conductor 35 is connected between the motor 16 to the positive terminal 36 of a transformer 37 connected between the terminal bar 38 and the 110 v. electrical source 39. The motor 16 is connected to the negative terminal 40 of the transformer 37 by a conductor 41.

The wind direction is indicated, therefore, when the vane 14 is acted thereon to operate the auto synchronous motor 16 which is synchronized with the motor 15 when the switch 29 is positioned to connect the conductors 30 and 31 with the conductors 33 and 34, the current being supplied through the conductors 35 and 41 from the source 39.

The outdoor temperature is indicated by the motor 15 when the switch 29 is in its lowermost position to close the circuit between the conductors 33 and 34 and the conductors 42 and 43 which are connected to an auto synchronous motor 44 in the outside temperature unit 45. The pointer 46 on the dial 12 is actuated by the motor 44. Current is supplied from the source 39 through the transformer 37 and the conductors 47 and 48 connected to the terminals 36 and 40 on the terminal bar 38. Current is supplied to the motor 15 through conductors 49 and 50 connected to the terminals 36 and 40.

For convenience a pilot lamp 51 is arranged on the panel 10 and is connected into the 110 v. Source 39 through conductors 52 and 53, and which is illuminated when the device is plugged into a service outlet. Another lamp 54 is arranged on or above the panel 10 for general illumination, such as for use with a television set, or the like, and has connection with the 110 v. source through conductors 55 and 56, the former having a switch 57 therein. Conductors 58 and 59 connect the opposite poles of the switch 29 to the 110 v. source. The transformer 38 is connected to the positive and negative terminals 36 and 40, respectively, by conductors 60 and 61.

The wind velocity is indicated by the activity of a fluid 62, preferably red in color, contained in a tubular reservoir 63 attached by a bracket 64 to the rear surface of the panel 10, as illustrated in FIGURE 4. The reservoir 63 is formed of glass or plastic material and has an integral transparent curved tube 65 formed with its lowermost end whereby the fluid 62 therein is drawn by vacuum into the tube 65 exerted by the wind passing across the open end of a tube 66 extending downwardly below the flange 28 of the conical roof unit 17, as shown by the arrows in FIGURE 2. The tubes 65 and 66 are connected by a flexible plastic tube 67 which is adapted to be arranged through the standard 20 of the unit 17 and extend into the building to be connected to the upper end of the transparent tube 65, as shown in FIGURE 4.

The tube 65 is arranged behind the panel 10 and is visible through a transparent strip 68 therein conforming in curvature to the tube 65, as shown in FIGURE 1, so that the colored fluid 62 in the tube 65 will register with the calibrations 69 arranged along the strip 68 which have numerals designating wind velocities in miles per hour. Such arrangement also indicates the gusty activity of the wind. The curvature of the tube 65, which changes from a gradual incline at its lower end to a relatively sharp upward curve toward its upper end, as shown in FIGURES 1 and 4. By forming the panel 10 of a clear plastic material, or glass, the strip 68 can be transparent while the remainder of the panel 10 is opaque, as by coating the same with enamel.

The tube 66 extends through the plate 23 into the unit 17 and is connected to the flexible tube 67 by a coupling 69 which is arranged about the motor 16 in the unit 17, in the manner shown in FIGURE 2. The lowermost end of the tube 66 is preferably flared for the best results and its diameter, while not necessarily critical, should be determined in accordance with the conditions under which it is installed. Obviously, the tube 66, with the tubes 67 and 65, can be utilized to indicate the wind velocities without the direction indicator, if desired, and with or without the conical unit 17. For the best results the panel 10 should be both plumb and level.

The panel 10 may be provided with a barometer 70 and a combination thermometer and humidity indicator 71, as shown in FIGURE 1.

The invention as illustrated and described is capable of changes and modifications in structure and design without departing from the spirit of the invention or the scope of the appended claim.

What is claimed is:

In a wind direction and velocity indicator having an outdoor unit amenable to wind currents and an indoor panel having a dial and a manometer tube thereon, the improvements comprising, a conical housing having a hollow substantially U-shaped supporting standard adapted to be attached to a roof, an auto-synchronous motor in said housing having a shaft depending below the flared end thereof, a vane connected to said shaft, a second auto-synchronous motor motor on said panel having a shaft extending through said dial and a pointer on the shaft of said second motor, electrical conductors in said hollow standard connecting said motors, and a tube connected to one end of said manometer tube, through said standard and said housing and depending below the flared end thereof.

References Cited in the file of this patent
UNITED STATES PATENTS

| | | |
|---|---|---|
| 631,161 | Froehlich | Aug. 15, 1899 |
| 1,897,658 | Apthrop | Feb. 14, 1933 |
| 2,191,955 | Chappell et al. | Feb. 27, 1940 |
| 2,838,932 | Dwyer | June 17, 1958 |